Oct. 21, 1952     E. CRANE     2,614,696
RECIRCULATION FILTER

Filed March 25, 1950     2 SHEETS—SHEET 1

INVENTOR.
Edward Crane
by: Beir, Freeman & Molinare
Attys.

Oct. 21, 1952
E. CRANE
2,614,696
RECIRCULATION FILTER
Filed March 25, 1950
2 SHEETS—SHEET 2
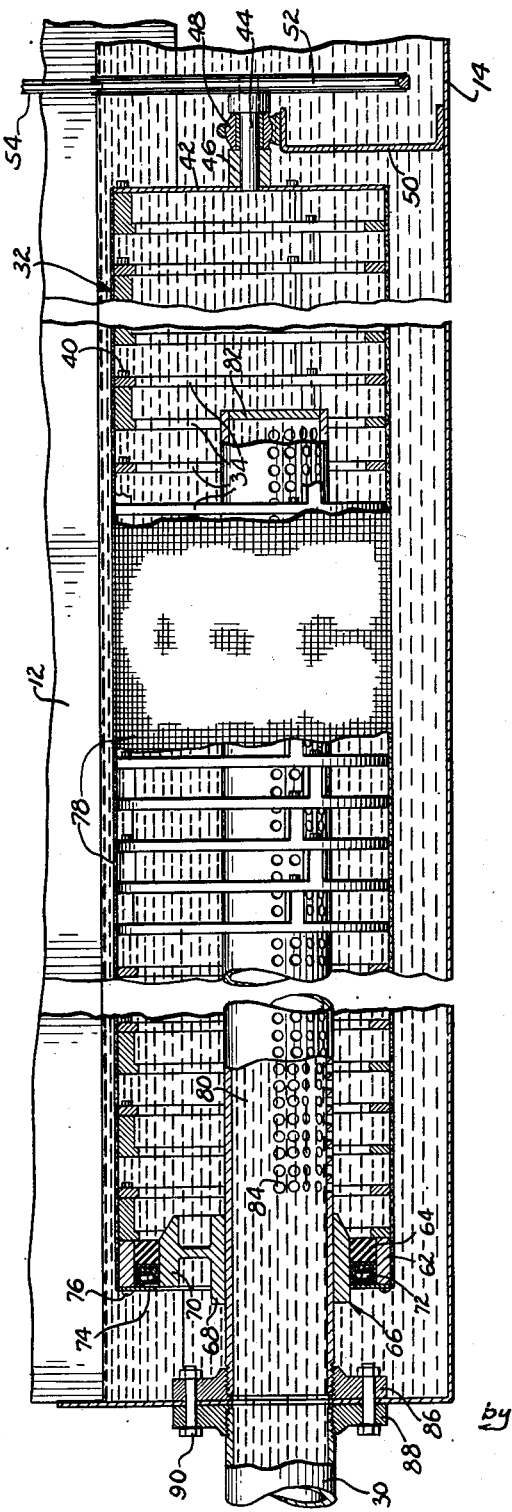
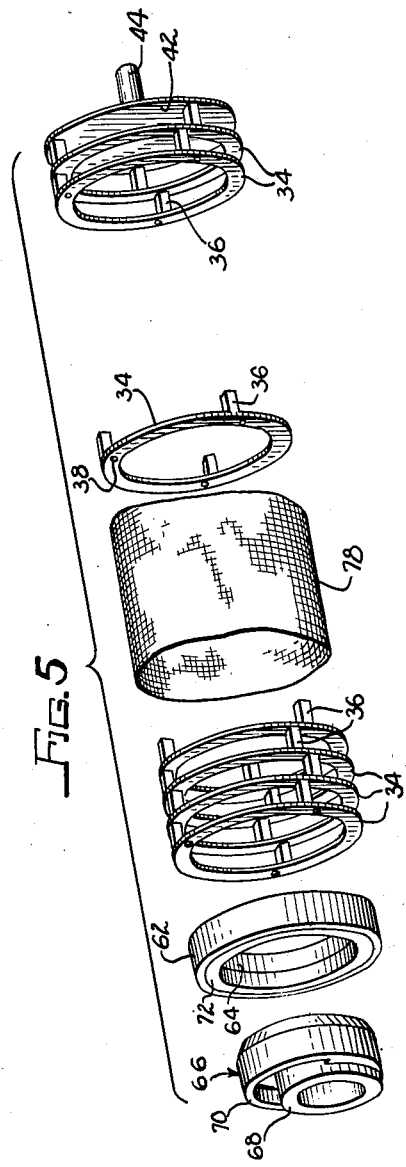
INVENTOR.
Edward Crane
by: Bair, Freeman & Molinare
attys.

Patented Oct. 21, 1952

2,614,696

UNITED STATES PATENT OFFICE 2,614,696

RECIRCULATION FILTER

Edward Crane, Ottumwa, Iowa, assignor to Barker Poultry Equipment Co., Ottumwa, Iowa, a corporation of Iowa Application March 25, 1950, Serial No. 151,911

9 Claims. (Cl. 210—152)

This invention relates to a filter for filtering liquids and may be included in the general classification of space filters.

One of the uses to which the filter may be set is in connection with poultry scalding machines although, of course, it may be employed in connection with other uses. In scalding poultry great quantities of water are required and the water must be heated. If fresh water is continuously used in the scalding process, the quantities employed would be too great with consequent losses in the amount of water used and the heat required for heating the water. When the poultry is scalded, feathers and other particles of foreign matter fall from the poultry and if the water is recirculated for re-use in scalding, those particles of foreign matter tend to clog the water nozzles. It therefore becomes greatly advantageous to recirculate the scalding water because of the great quantities required and it likewise becomes necessary to employ a highly efficient filter so that the particles of foreign matter can be filtered out of the scalding water. An object, therefore, of the present invention is the provision of a filter which is highly efficient for filtering great quantities of water.

The filter of the present invention consists of a tubular filter structure rotatably mounted in the receptacle containing the water to be filtered and is immersed in the water. The filtered water is withdrawn from the interior of the filter structure and rotation of the filter structure effectively prevents the particles of foreign matter from clogging the filter element.

More specifically, the filter or filter structure includes a tubular screen filter element mounted on a supporting structure which has a plurality of vanes disposed adjacent the periphery of the tubular screen element. As the screen rotates, the vanes by centrifugal force expel or tend to expel the water from the interior of the filter to the exterior, and the water to be recirculated is drawn through the screen element at the lower portion thereof. The vanes in thus forcing the water outwardly through the filter element, establish a backwashing action through that portion of the screen which is not being utilized at the particular time for drawing water therethrough for filtering purposes.

Other advantages of the invention will be apparent as the description of the specific embodiment herein disclosed proceeds.

With these and other advantages in view, my invention consists in the construction, arrangement, and combination of the various parts of my device whereby the objects contemplated are attained, as hereinafter more fully set forth, pointed out in the claims, and illustrated in the accompanying drawings, wherein:

Figure 4 is an enlarged view of the filter structure showing a portion in section and a portion in elevation; and Figure 5 is an exploded isometric view of the various elements making up the filter structure.

Figure 1:
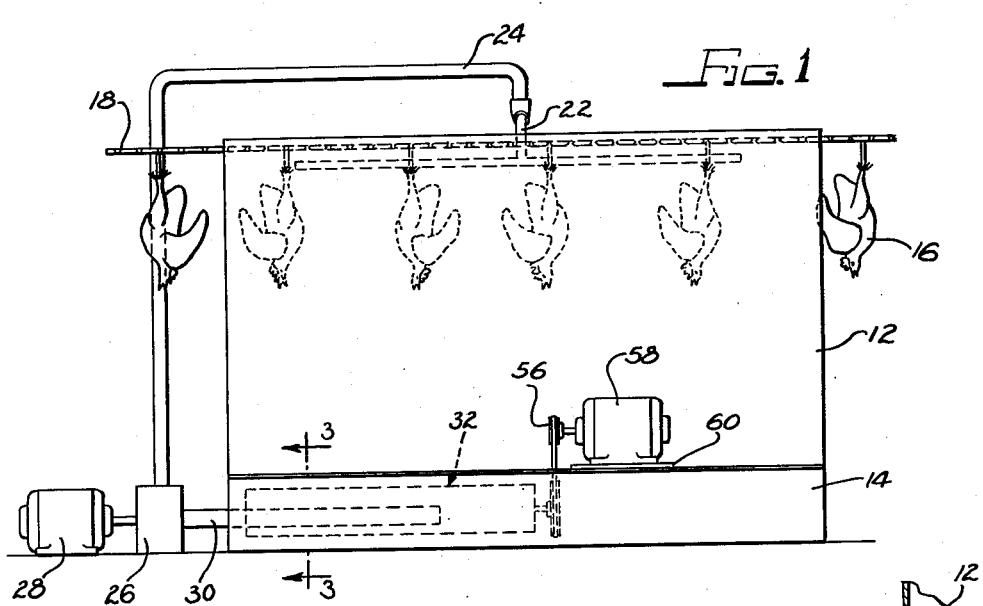
Figure 1 is a diagrammatical illustration of a poultry scalder embodying the present invention.

Referring in detail to the drawings, Figure 1 illustrates a poultry scalder at 12 mounted on top of a tank or receptacle 14. The scalder proper 12 is shown in its simplest elements for the purpose of clarity and as here illustrated is in the form of a tunnel having an open bottom and communicating with the tank 14. The tank 14 extends laterally beyond the scalder 12 on one side thereof and the tank is adapted to receive the water from the scalder after the water has been used for scalding poultry. Fowls are indicated at 16 suspended on shackles mounted on a conveyor 18 which passes through the scalder. Within the scalder are nozzles 20 on opposite sides of the longitudinal center line arranged for directing scalding water therefrom onto the fowls. The nozzles 20 are fed by pipes 22 which lead from a main pipe 24 which in turn communicates with the outlet of a pump 26 driven by an electric motor 28. The intake of the pump represented by a pipe 30 communicates with the tank 14. Upon operation of the pump 26, the scalding water is withdrawn from the tank 14 and caused to flow through the pipes 24 and 22 to the nozzles 20 where the water is directed onto the fowls and it falls into the tank 14 to be recirculated.

The filter structure of the present invention is indicated in its entirety by the numeral 32 and is shown in dotted lines in Figure 1 to indicate its relationship to the scalder and the tank.

Figure 3:
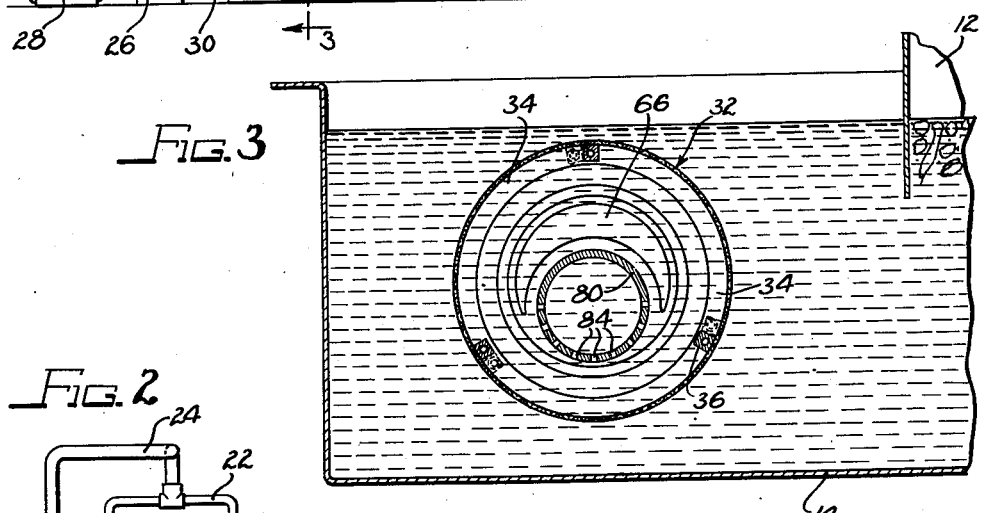
Figure 3 is an enlarged sectional view taken on line 3—3 of Figure 1.
Figure 2:
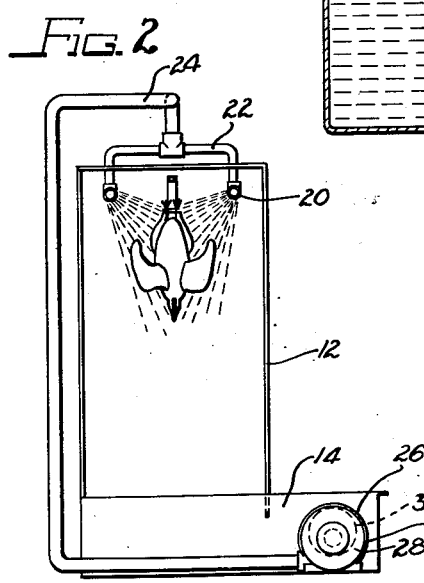
Figure 2 is a view from the left of Figure 1.

Attention is directed to Figures 3, 4 and 5 for the details of the filter structure. The filter structure 32 is relatively long and tubular and includes a framework made up of a plurality of rings 34. Each ring 34 has a plurality of circumferentially spaced, axially extending spacers 36 which may be also referred to as vanes, preferably integral with the ring. The rings 34 are so arranged that the extended ends of the spacers 36 of one ring engage the next adjacent ring so that the rings are spaced apart axially of the structure. The rings 34 are provided with holes 38 for receiving screws 40 that are threaded into tapped holes in the extended ends of the spacers 36. The screws 40 thus lock adjacent rings together which are then locked into a cylindrical structure that is self-sustaining throughout its length. Preferably the spacers 36 are offset slightly circumferentially from one ring to the next.

One end of the filter structure 32 is closed by a plate 42 secured to the end ring 34. Mounted on the plate 42 is a shaft 44 reinforced by a collar 46 and mounted in a bearing 48. The bearing 48 is universally mounted on a stand or bracket 50 mounted in the tank 14, to compensate for movement of the opposite end of the filter structure. Secured on the outer end of the shaft 44 for rotation therewith is a pulley 52 over which is trained a belt 54, the belt being also trained over a pulley 56 on the drive shaft of an electric motor 58. The motor 58 may be mounted on any convenient platform, such as 60, supported at the upper surface of the tank 14, the motor being adapted for rotating the filter structure 32.

At the opposite end of the filter structure is an annular end member secured to the adjacent ring 34 by any suitable means. Fitted in the inner surface of the member 62 is an annular bearing member 64 which in turn is fitted on a bearing member 66. The annular member 64 may be of rubber or similar material and the bearing member 66 is preferably a casting. Figures 5 and 3 show to best advantage the shape of the bearing member 66 which includes a central flange 68 and an outer flange 70 which is eccentric with respect to the flange 68, and coaxial with the tubular screen structure 32. An oil seal 72 which may be conventional surrounds flange 70 fitting against the member 64 and secured in place by an annular plate-like element 74 which is secured to the member 62 by means of screws 76.

Surrounding the framework made up of the rings 34 is a screen element 78 in the form of a sleeve which fits tightly on the framework and may be held in place by friction or it may be welded to certain of the rings 34.

A tubular member or pipe 80 is fitted in the central opening of the member 66 and extends into the interior of the filter structure 32 for the greater part of its length. The inner end of the tubular member 80 is closed by a plate 82 and the lower surface of the tubular member is provided with a plurality of holes 84. The outer end of the tubular member 80 is threaded into a flange 86. The pipe 30 previously referred to leading from the intake of the pump 26 is similarly threaded into a flange 88. The flanges 86 and 88 are fitted against opposite sides of the wall of the tank 14 and secured together and to the wall of the tank by bolts 90, with the pipes 80 and 30 in axial alignment and communicating with each other through an opening in the wall of the tank.

The interior of the filter structure 32 is effectively closed at its ends to the tank and water flows into and through the filter only through the screen element 78.

I have found that if the filter structure 32 is rotated before the recirculation of the water begins, the filter will always remain open for the passage of water in spite of large masses of foreign particles in the water.

The filter structure 32 is rotated by the motor 58 as above described and the pump 26 withdraws water from the interior of the filter for recirculating the water. On rotation of the filter structure 32, the spacers 36 act as vanes and by centrifugal force tend to force the water from the interior of the filter structure outwardly through the screen element 78. When the filter is immersed in water as indicated in Figure 4, the centrifugal action is equal in all directions. The holes 84 in the tubular member 80 are disposed on the underside thereof and for that reason the water withdrawn through the tubular member by the pump is drawn upwardly from the bottom of the filter structure. In the lower part of the tank and below the filter, the foreign particles have an opportunity to fall away from the filter and be deposited in the tank. The water is not drawn through the screen element 78 at the top portion of the filter, but instead the water is forced outwardly therethrough, causing a backwashing action which dislodges any particles that may have accumulated on the screen.

It will be noted that the tubular member 80 is disposed in the lower portion of the screen structure which enhances the action of the water being drawn through the screen element 78 at the lower portion of the filter.

The tubular member 80 provides the support for one end of the filter structure 32. The bearing member 66 is fixed with respect to the tubular member 80 and the filter element rotates on its own central longitudinal axis and this axis of rotation is eccentric to the longitudinal axis of the tubular member 80. Consequently, the portion of the screen element 78 that is at the bottom and nearest the holes 84 is constantly and progressively changing with the result that water is drawn through a constantly changing portion of the screen element and the remainder of the screen element is being backwashed, thus retaining the screen element constantly free of clogging by foreign particles.

While I have herein shown and described a preferred embodiment of my invention, manifestly it is capable of modification and rearrangement of parts without departing from the spirit and scope thereof. I do not, therefore, wish to be understood as limiting this invention to the precise form herein disclosed, except as I may be so limited by the appended claims.

I claim as my invention:

1. A filtering device comprising an elongated cylindrical drum adapted for being mounted submerged in a liquid in a container, the cylindrical surface of said drum being a filter screen through which the fluid passes to the interior of the drum, means for rotating said drum around its longitudinal axis, an elongated suction pipe through one end of said drum and extending within said drum parallel to the cylindrical wall thereof, said suction pipe being positioned eccentric with respect to the axis of said drum, whereby the spacing from the wall of the pipe to the cylindrical wall of the drum varies continuously around the periphery of the pipe, a portion of said pipe having intake holes therein providing for movement of filtered water into said pipe, said intake holes being the only openings in the length of said pipe extending within said drum, said intake holes being located at and adjacent to the region of minimum spacing between the pipe and the drum, and a portion of the pipe being imperforate and cooperating with the rotating cylindrical wall of the drum and the fluid in the space therebetween to pump a portion of the fluid therebetween reversely through the screen to clean said screen.

2. A filtering device comprising an elongated cylindrical drum adapted for being mounted submerged in a liquid in a container, the cylindrical surface of said drum being a filter screen through which the fluid passes to the interior of the drum, means for rotating said drum around its longitudinal axis, an elongated suction pipe passing through one end of said drum and extending within said drum parallel to the cylindrical wall thereof, the extended end of said suction pipe being closed, said suction pipe extending within said drum over the greater portion of the length of said drum, said suction pipe being positioned eccentric with respect to the axis of said drum, whereby the spacing between the cylindrical wall of the pipe and the cylindrical wall of the drum varies continuously around the circumference of the pipe from a minimum to a maximum and back to a minimum, a portion of the cylindrical wall of the pipe having intake holes therein providing for movement of filtered water into said pipe, said intake holes opening from said pipe generally in the same direction as the direction in which the pipe is offset from the axis of the drum, and a portion of the pipe being imperforate and cooperating with the rotating cylindrical wall of the drum and the fluid in the space therebetween to pump a portion of the fluid therebetween reversely through the screen to clean said screen.

3. A device as set forth in claim 1, wherein the cylindrical drum includes a plurality of circular rings disposed axially adjacent each other, and a plurality of circumferentially spaced spacer elements between each two adjacent rings for axially spacing said rings apart.

4. A device as set forth in claim 1 wherein said intake holes are located over substantially one-half of the circumference of said pipe, which half of said pipe is spaced least from the cylindrical wall of the drum.

5. A device as set forth in claim 2 wherein the portion of the cylindrical wall of the pipe having intake holes therein extends substantially along the entire length of the pipe positioned with said drum.

6. A device as set forth in claim 2 wherein the axis of said intake pipe is spaced substantially vertically below the axis of the drum, and said intake holes are located within the lower half of the pipe.

7. A device as set forth in claim 1 wherein the axis of said intake pipe is spaced substantially vertically below the axis of the drum, and said intake holes are located substantially over the lower half of the pipe and along substantially the entire length of the pipe positioned within the drum.

8. A device as set forth in claim 1, wherein the portion of the pipe having intake holes therein extends substantially along the entire length of the pipe positioned within said drum.

9. A device as set forth in claim 1, wherein the axis of said intake pipe is spaced substantially vertically below the axis of the drum, said intake holes being located within the lower half of the pipe.

EDWARD CRANE.

REFERENCES CITED

The following references are of record in the file of this patent:

UNITED STATES PATENTS

| Number | Name | Date |
| --- | --- | --- |
| 963,186 | Trump | July 5, 1910 |
| 1,212,978 | Malone | Jan. 16, 1917 |
| 1,513,878 | Anthony | Nov. 4, 1924 |